Feb. 29, 1944. R. J. CHAPMAN 2,342,919
TORQUE TESTING DEVICE
Filed April 3, 1943 2 Sheets-Sheet 1

INVENTOR.
Roy J. Chapman
BY Carlos G. Stratton
ATTORNEY.

Feb. 29, 1944.  R. J. CHAPMAN  2,342,919
TORQUE TESTING DEVICE
Filed April 3, 1943  2 Sheets-Sheet 2
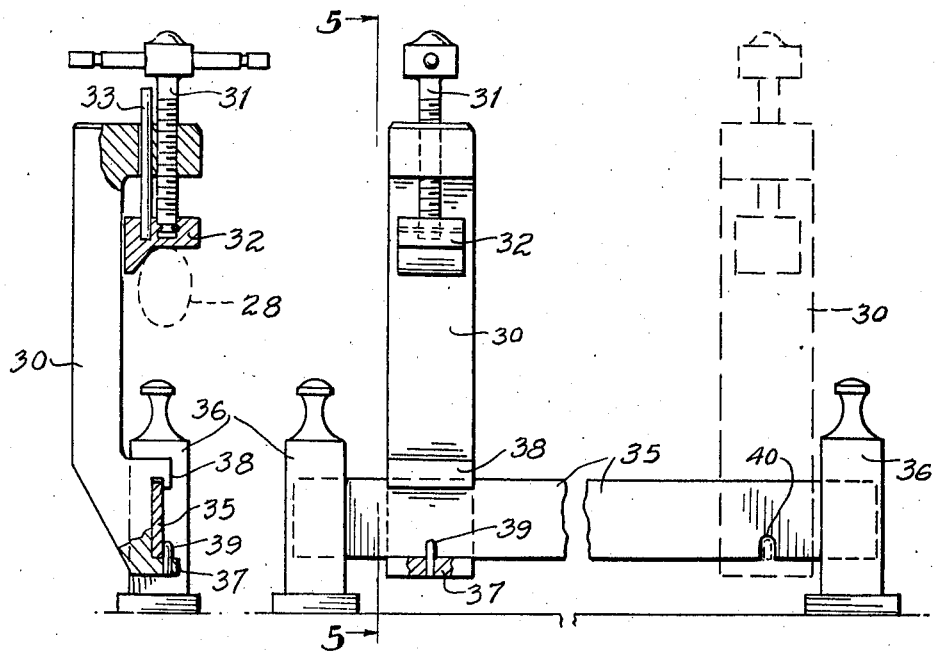
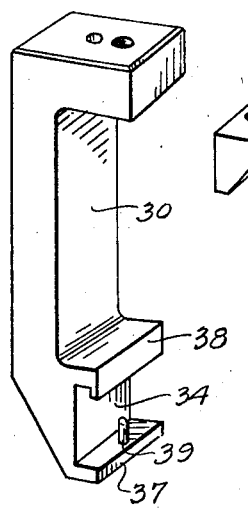
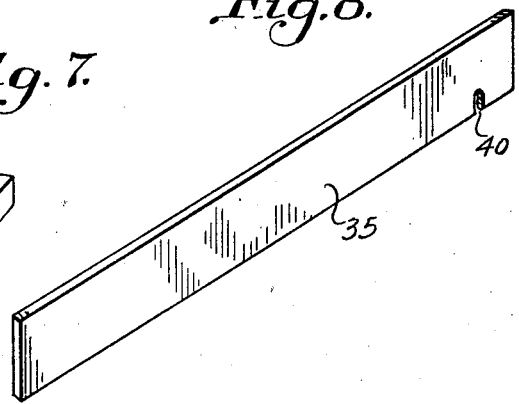
INVENTOR.
Roy J. Chapman
BY Carlos G. Stratton
ATTORNEY.

Patented Feb. 29, 1944

2,342,919

UNITED STATES PATENT OFFICE 2,342,919

TORQUE TESTING DEVICE

Roy J. Chapman, Los Angeles, Calif.

Application April 3, 1943, Serial No. 481,709

10 Claims. (Cl. 265—1)

The present invention relates generally to apparatus for testing the accuracy of what are commonly known as torque wrenches in order to check, from time to time, the efficiency of such wrenches in machine and laboratory use.

Torque wrenches are now in extensive use for many purposes in factories and laboratories where it is essential that a torque pressure shall be applied to the work in definite foot and inch pounds. For continued efficiency it is very important not only that the wrenches be tested for accuracy from time to time to avoid the possible results of mechanical failures, but also that any apparatus used for this purpose shall itself be of a nature admitting of its ready test.

It is the primary object of the present invention to provide a testing apparatus or mechanism which is capable of ready, convenient and effective use to test both right and left hand torque of torque wrenches, and which is itself of a nature permitting ready test of its own efficiency to offset possible inaccuracy due to climatic or other natural conditions or mechanical failure.

More particularly it is an object of the present invention to provide a normally balanced beam scale mechanism which is readily adaptable to be read in foot pounds to correspond to the wrench dials; which is of a nature capable of being readily and easily tested in respect to its foot pound indications, and which is adaptable to the ready easy association of a torque wrench in a manner permitting test of either right or left hand torque, and also permitting a reading thereof in foot pounds corresponding to the foot pound readings of the wrench dial.

In keeping with the foregoing, there has been selected as the best mode thus far devised for carrying the invention into practical use, the apparatus shown in the accompanying drawings, and which will now be described in detail in reference thereto.

The invention also comprises novel detail of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 4 is an enlarged detail side view, partly broken away and in section, showing the pressure applying means for engaging the wrench handle.

Fig. 5 is a vertical transverse sectional view taken substantially on line 5—5 of Fig. 4, parts being shown broken away, and Figs. 6, 7 and 8 are detail perspective views, respectively, of the pressure jack, its adjustable pressure head, and one of its supporting bars.

Figure 1:
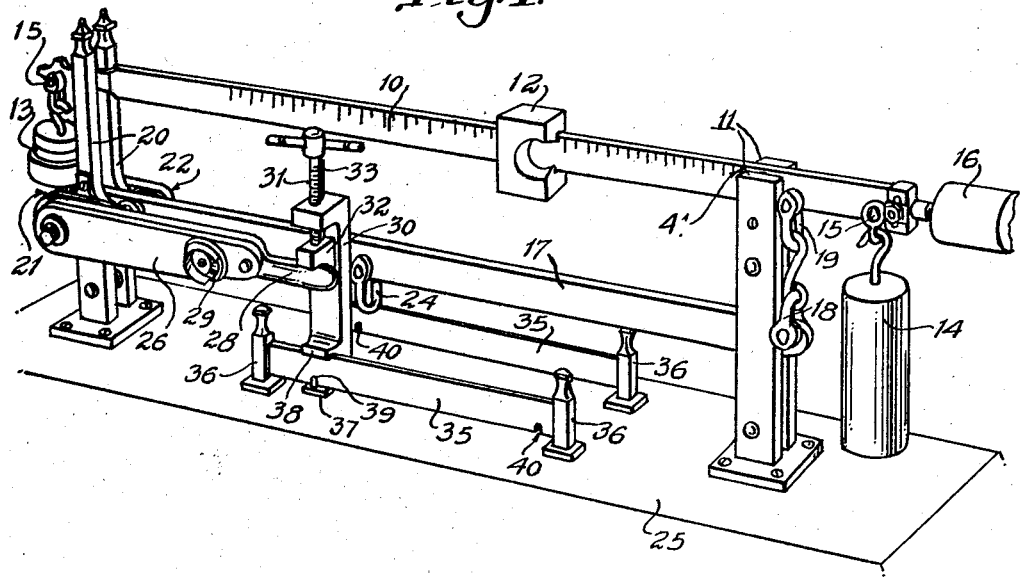
Fig. 1 is a perspective view of the invention illustrating its practical use.
Figure 3:
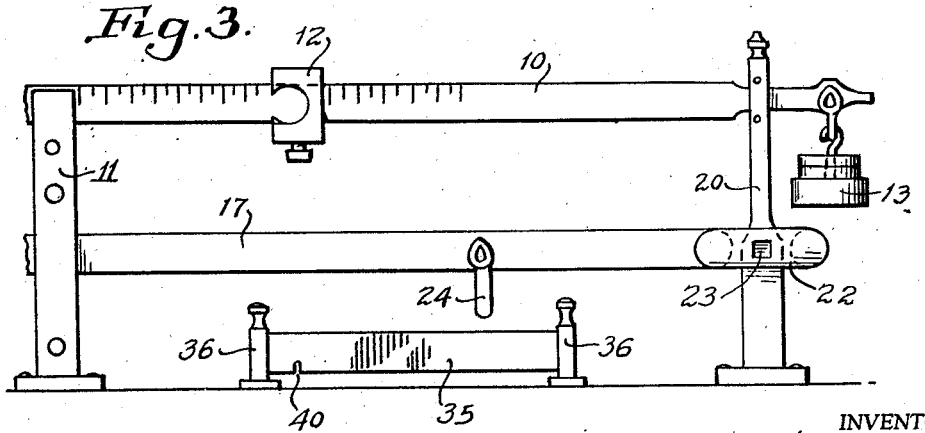
Fig. 3 is a partial side view of the testing apparatus looking at the opposite side thereof with respect to Fig. 1.

Referring to the above described figures of the drawings, and particularly to Fig. 1, there is shown a balance scale including an upper balance beam 10 which is fulcrumed adjacent to one end between the upper portions of spaced standards 11 and is graduated on both faces in foot and inch pounds as seen in Figs. 1 and 3. This beam is equipped with a sliding poise 12 and is balanced by standard weights 13 and 14 suitably hung by knife bearings 15 at its opposite ends and by a suitable adjustable counter-poise 16.

A load beam 17 below the balance beam 10, has its free end movable between the standards 11 and is connected to the balance beam by suitably joined knife bearing loops 18 and 19. The other end of the load beam 17 has suitable bearing, preferably in ball bearings, through standards 20 and at this end carries rigid brackets 21 and 22 at opposite sides of said standards 20, each of which brackets has a socket 23, in line with its bearing, to receive the implement engaging head of the torque shaft of a torque wrench of standard manufacture, as presently described, and arranged so that when a wrench is properly applied to the socket of either bracket, that is at either side of the load beam, the wrench will extend parallel with and along the load beam.

The load beam 17 is shown with a test loop 24 spaced twelve inches from its bearing between standards 20 so that by test weights on this loop 24 the beam 10 may be tested as to balance with the poise at various inch and foot graduations thereof.

It is to be understood that the balance or scale as a whole will be mounted on a suitable base 25 to which the standards are rigidly secured and that, in practice, this supporting base will be such that it may be assured of a a level position for the extreme accuracy required in its testing functions.

Figure 2:
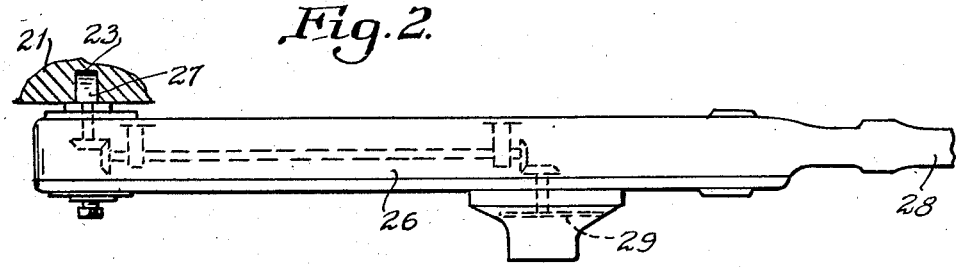
Fig. 2 is an enlarged plan view looking down upon the torque wrench and showing in section a portion of the testing mechanism engaged by the wrench during test thereof.

A standard torque wrench 26 is shown in Figs. 1 and 2 at one side of and parallel with the load beam 17 by reason of the extension of its implement-engaging, torque shaft head 27 engaged in the socket 23 of the beam bracket 21 (see Fig. 2), this being for the test of right hand torque of the wrench. The wrench is shown with a handle 28 and a meter or dial 29 which registers in foot and inch pounds the pressure deflection of the handle 28, in use, with respect to the shaft head 27.

An angular upright jack 30 is shown with an adjustable jack screw 31 swiveled at its lower end in connection with a vertically adjustable pressure head 32. This pressure head 32 is held against rotation by a guide stem 33 slidable through the jack head in parallel relation to the jack screw 31, so that when the latter is rotated, the pressure head 32 is shifted vertically. At its lower portion the jack 30 has a slideway 34 by which it is shiftable lengthwise of the load beam 17 so that its pressure head 32 may be accommodated to the handles 28 of wrenches of different lengths, and also in order that it may be shifted from one side of the load beam to the other side thereof.

For the above purpose a support for the jack is placed at each side of the load beam 17, each support consisting of a horizontal rail 35 lengthwise of, and below and parallel to, the load beam 17, with its ends rigidly supported in pedestals 36 fixed on the base 25. The slideway 34 of the jack is formed to receive either of the rails 35, between a lower angular flange 37 and an upper undercut shoulder 38. The flange 37 has an upstanding pin 39, and each rail 35 has near one end a lower notch 40 through which the pin 39 may be shifted in rocking the jack 30 onto, and off of, either rail. Thus, the jack may be applied to one rail as in Fig. 1 when testing right hand torque of the wrench 26, and quickly removed and applied to the other rail when testing left hand torque of the wrench, with the latter positioned at the corresponding side of the load beam as above described.

In operation, assuming the balance scale has been leveled and properly tested, a wrench 26 may be applied, as previously described, with the poise 12 adjacent to the fulcrum of balance beam 10 at the zero mark 41 of the beam graduations. The jack 30 is then shifted until the pressure head 32 is properly positioned above the wrench handle 28, and the head run down onto the handle, by means of the jack screw 31 until the meter or dial 29 shows the foot or inch pressure at which the wrench is to be presently tested. When this pressure on the meter or dial has been reached, the poise 12 is shifted until beam 10 balances, it being understood that the pressure applied to the wrench handle has been communicated to the load beam 17 through the head 27 of the torque shaft of the wrench seated in the beam socket 23, and from the load beam to the balance beam 10 so as to unbalance the latter while the poise is at the zero point.

When the beam 10 has, in the above manner, been again brought into balance, the graduation on the balance beam 10 should read in inch and foot pounds precisely as the meter or dial 29 of the wrench at that time. If the readings agree, the wrench tests, but if they do not agree, the mechanism of the wrench must be removed and changed or adjusted until they do agree.

It is believed to be plain from the foregoing that after thus testing the right hand torque of the wrench as in Fig. 1, the wrench is removed, after releasing the jack, and switched to a similar position with respect to, and at, the other side of the load beam in similar engagement with the socket of the beam bracket 22. The jack is removed to the other rail 35 at the corresponding side, and the testing of the left hand torque of the wrench is proceeded within the same manner as previously described for test of its right hand torque.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In a testing apparatus for a torque wrench having a torque meter, a scale mechanism including a balance beam having balancing weights and graduations therealong in accord with the torque meter, a poise slidable on said beam and cooperating with the graduations thereof to indicate degrees of unbalance of the beam, and a load beam having a bearing adjacent to one end thereof and connected at its opposite end to the balance beam to unbalance the latter beam in accord with load applied to the load beam, means for coupling the implement engaging element of the wrench in torque communicating relation to said load beam in line with its said bearing, and means adjacent thereto for applying torque pressure to a wrench when so coupled, to thus unbalance the balance beam through the load beam.

2. The apparatus as set forth in claim 1, in which the coupling means and the torque pressure applying means are effective at opposite sides of the load beam for similarly testing right and left hand wrench torque.

3. In a testing apparatus for a torque wrench having a torque meter, a scale mechanism including a balance beam having balancing weights and graduations therealong in accord with the torque meter, a poise slidable on said beam and cooperating with the graduations thereof to indicate degrees of unbalance of the beam, and a load beam having a bearing adjacent to one end thereof and connected at its opposite end to the balance beam to unbalance the latter beam in accord with load applied to the load beam, means for coupling the implement engaging element of the wrench in torque communicating relation to said load beam in line with its said bearing, and means adjacent thereto for applying torque pressure to a wrench when so coupled, to thus unbalance the balance beam through the load beam, said last named means being adjustable relative to the scale mechanism for accommodating wrenches of different lengths.

4. In a testing apparatus for a torque wrench having a polygonal implement engaging member, and a torque meter, a scale mechanism including a load beam having a bearing adjacent to one end thereof and a laterally opening polygonal socket in line with said bearing to receive the polygonal implement engaging member of the wrench in torque communicating relation, a balance beam connected to the load beam in a manner to be balanced when the load beam is at rest and graduated in accord with the torque meter of the wrench, and an adjustable poise member on said balance beam cooperating as an indicator with the graduations thereof, and means adjacent to said mechanism and adjustable lengthwise of the wrench to apply torque pressure to a wrench when coupled with the load beam, to thus place the load beam under load and unbalance the balance beam to the extent of the applied pressure.

5. In a testing apparatus for a torque wrench having a torque head and a torque meter, a normally balanced torque measuring mechanism including a pivotally supported load beam, and movable means in connection with said load beam for determining the degree of unbalance thereof and graduated to accord with the torque meter of the wrench, means to couple the torque head of the wrench in torque communicating relation to said load beam in line with its pivot, whereby to unbalance the beam in accord with torque pressure applied to the wrench, and means adjacent to said mechanism for applying torque pressure to the wrench when so coupled.

6. In a testing apparatus for a torque wrench having a torque head and a torque meter, a normally balanced torque measuring mechanism including a part graduated to accord with the torque meter, and an adjustable element movable in cooperation with said part and its graduations to correct and indicate unbalance thereof, means to couple the torque head of the wrench to said mechanism in torque communicating relation for unbalancing said graduated part in accord with torque pressure applied to the wrench, and means adjacent to said mechanism for applying torque pressure to the wrench when so coupled, said last named means including a jack and a support for the jack on which it is adjustable relative to the torque measuring mechanism.

7. In a testing apparatus for a torque wrench having a torque head and a torque meter, a normally balanced torque measuring mechanism including a part graduated to accord with the torque meter, and an adjustable element movable in cooperation with said part and its graduations to correct and indicate unbalance thereof, means to couple the torque head of the wrench to relatively opposite sides of said mechanism in torque communicating relation for unbalancing said graduated part in accord with right hand and left hand torque pressure applied to the wrench, and means applicable to both sides of said mechanism for applying torque pressure to the wrench to create unbalance of the mechanism to accord with the pressure so applied.

8. In a testing apparatus for a torque wrench having a torque head and a torque meter, a pressure measuring mechanism having indicating means graduated in accord with the torque meter and including a pivoted member, means for coupling the torque head of the wrench in torque communicating relation with said pivoted member in line with its pivot, and means for applying torque pressure to the wrench when so coupled, to thus similarly affect the torque meter of the wrench and the indicating means of the measuring mechanism.

9. In a testing apparatus for a torque wrench having a torque head and a torque meter, a movable member having a bearing and recesses at opposite sides of, and in line with, said bearing to receive the torque head of the wrench in torque communicating relation, means shiftable to relatively opposite sides of said member to apply torque pressure to a wrench so associated with the member and to place the member under a corresponding load, and a balance mechanism connected with said member and effective to indicate the load thereon.

10. In a torque testing apparatus for a torque wrench having a torque head, supporting means, a load beam pivoted on said supporting means, means carried by said load beam in line with its pivot to engage the torque head of the wrench in torque communicating relation, means arranged to be adjustable along a wrench so engaged, for applying torque pressure to the wrench and place the load beam under corresponding load, and load measuring and indicating means in association with said load beam.

ROY J. CHAPMAN.